(12) United States Patent
Kotinas et al.

(10) Patent No.: US 10,721,254 B2
(45) Date of Patent: Jul. 21, 2020

(54) SYSTEMS AND METHODS FOR BEHAVIORAL CLUSTER-BASED NETWORK THREAT DETECTION

(71) Applicant: Crypteia Networks S.A., Athens (GR)

(72) Inventors: Ilias Kotinas, Athens (GR); Theocharis Tsigkritis, Athens (GR); Giorgos Gkroumas, Athens (GR)

(73) Assignee: Crypteia Networks S.A., Athens (GR)

( * ) Notice: Subject to any disclaimer, the term of this patent is extended or adjusted under 35 U.S.C. 154(b) by 288 days.

(21) Appl. No.: 15/909,786

(22) Filed: Mar. 1, 2018

(65) Prior Publication Data

US 2018/0255084 A1    Sep. 6, 2018

Related U.S. Application Data

(60) Provisional application No. 62/466,179, filed on Mar. 2, 2017.

(51) Int. Cl.
*H04L 29/06* (2006.01)
*G06K 9/62* (2006.01)

(52) U.S. Cl.
CPC ........ *H04L 63/1425* (2013.01); *G06K 9/6218* (2013.01); *G06K 9/6222* (2013.01); *G06K 9/6247* (2013.01); *G06K 9/6251* (2013.01); *G06K 9/6267* (2013.01); *G06K 9/6284* (2013.01); *H04L 63/1441* (2013.01)

(58) Field of Classification Search
CPC ............ H04L 63/1425; H04L 63/1441; G06K 9/6218; G06K 9/6222; G06K 9/6247; G06K 9/6251; G06K 9/6267; G06K 9/6284
See application file for complete search history.

(56) References Cited

U.S. PATENT DOCUMENTS

| | | | |
|---|---|---|---|
| 5,479,574 A * | 12/1995 | Glier | G06K 9/6274 706/25 |
| 7,742,982 B2 * | 6/2010 | Chaudhuri | G06Q 20/10 705/38 |
| 10,417,415 B2 * | 9/2019 | Abbaszadeh | H04L 63/1425 |
| 2005/0060295 A1 * | 3/2005 | Gould | H04L 41/0896 |
| 2013/0097706 A1 * | 4/2013 | Titonis | G06N 20/00 726/24 |
| 2014/0173739 A1 * | 6/2014 | Ahuja | G06F 21/577 726/25 |
| 2015/0026785 A1 * | 1/2015 | Soon-Shiong | G06F 21/10 726/7 |

(Continued)

*Primary Examiner* — Sarah Su
(74) *Attorney, Agent, or Firm* — EIP US LLP

(57) ABSTRACT

Systems and methods for threat detection in a network are provided. The system obtains recoils for entities that access a network. The records include attributes associated with the entities. The system identifies features for each of the entities based on the attributes. The system generates a feature set for each of the entities. The feature set is generated from the features identified based on the attributes of each of the entities. The system forms clusters of entities based on the feature set for each of the entities. The system classifies each of the clusters with a threat severity score calculated based on scores associated with entities forming each of the clusters. The system determines to generate an alert for an entity in a cluster response to the threat severity score of the cluster being greater than a threshold.

18 Claims, 6 Drawing Sheets

(56) References Cited

U.S. PATENT DOCUMENTS

| | | | |
|---|---|---|---|
| 2015/0163242 A1* | 6/2015 | Laidlaw | G06F 21/552 |
| | | | 726/22 |
| 2015/0188930 A1* | 7/2015 | Turnbull | H04L 63/1425 |
| | | | 726/1 |
| 2015/0371044 A1* | 12/2015 | Home | G06F 21/57 |
| | | | 726/25 |
| 2016/0378978 A1* | 12/2016 | Singla | G06F 21/55 |
| | | | 726/23 |
| 2017/0006135 A1* | 1/2017 | Siebel | G06F 9/5072 |
| 2017/0026391 A1* | 1/2017 | Abu-Nimeh | G06F 16/285 |
| 2017/0102978 A1* | 4/2017 | Pallath | G06F 11/0709 |
| 2017/0258383 A1* | 9/2017 | Dagum | A61B 5/163 |
| 2018/0025157 A1* | 1/2018 | Titonis | H04W 12/1208 |
| | | | 726/24 |
| 2018/0041528 A1* | 2/2018 | Machlica | H04L 63/1425 |
| 2018/0139227 A1* | 5/2018 | Martin | H04L 63/1433 |
| 2018/0183821 A1* | 6/2018 | Schneider | G06F 16/285 |
| 2018/0211333 A1* | 7/2018 | Lacknnan | G06N 20/00 |

\* cited by examiner

SYSTEMS AND METHODS FOR BEHAVIORAL CLUSTER-BASED NETWORK THREAT DETECTION

CROSS-REFERENCES TO RELATED APPLICATIONS

This application claims the benefit of priority under 35 U.S.C. § 119 to U.S. Provisional Patent Application No. 62/460,179, filed Mar. 2, 2017, and titled "SYSTEMS AND METHODS FOR BEHAVIORAL CLUSTER-BASED NETWORK THREAT DETECTION," which is hereby incorporated herein by reference in its entirety.

FIELD OF THE DISCLOSURE

This disclosure generally relates to systems and Methods for a network security monitor that identifies infected network infrastructure.

BACKGROUND OF THE DISCLOSURE

Computer networks or systems may have vulnerabilities that can be exploited by w attack or a threat. An exploited vulnerability can adversely affect the operation of the computer network, suck as by slowing down the flow of data over the computer network, or preventing access to resources of the computer system.

BRIEF SUMMARY OF THE DISCLOSURE

The present disclosure relates generally to a network security monitor that performs behavioral clustering to detect threats in a computer network or network infrastructure. In network infrastructure that can include one or more distributed or centralized entities (e.g., network nodes, network elements, network components, or networked devices), it may be challenging to obtain or collect information from each of the network entities. It may be challenging to collect information (or the same information) from one or more network entities for various reasons, such as the network entity may be offline, damaged, busy processing other requests, improperly configured, or compromised. It may be challenging for the network security monitor to detect or determine threatful behavior corresponding to a network entity without collecting information item the network entity. Thus, it may be challenging to deters nine or detect threatful behavior with partial information from the network infrastructure.

Systems and methods of the present solution provide a network security monitor that can use one or more behavioral clustering techniques to group behaviors of entities that have a similar behavior. The network security monitor can further assign to the entities a threat severity score according to the group in which they are clustered based on their behavior. Entities can include, for example, internal internet protocol addresses ("IPs", external IPs, autonomous system numbers ("ASN"), domains, emails and devices. The network security monitor can determine that an entity that belongs to a group of threatful (or threatening or a security risk) entities is likely (e.g., has a likelihood or probability greater than a threshold) to be also threatful, and an entity that belongs to a group of non-threatful entities is likely to be also non-threatful.

At least one aspect is directed to a method of detecting threats in a network. The method can include obtaining, by a network security monitor, a plurality of records for a plurality of entities that access a network. The plurality of records can include attributes associated with the plurality of entities. The network security monitor can identify a plurality of features for each of the plurality of entities based on the attributes of each of the plurality of entities. The network security monitor can generate a feature set for each of the plurality of entities. The feature set can be generated from the plurality of features identified based on the attributes of each of the plurality of entities. The network security monitor can form a plurality of clusters of entities based on the feature set for each of the plurality of entities. The network security monitor can classify each of the plurality of clusters with a threat severity score calculated based on scores associated with entities forming each of the plurality of clusters. The network security monitor can determine to generate an alert for an entity in a cluster of the plurality of clusters responsive to the threat severity score of the cluster being greater than a threshold.

In some embodiments, the network security monitor can aggregate in a time context the attributes associated with the plurality of entities. The network, security monitor can aggregate the attributes using at feast one of an average, sum, count, unique count minimum value or maximum value. The network, security monitor can identifying the features based on the aggregated attributes.

The network security monitor can transform the plurality of features for each of the plurality of entities as my at least, one of a logarithmic function, exponential function, or root function. The network security monitor can generate the feature set for each of the plurality of entities using the transformed plurality of features for each of the plurality of entities.

The network security monitor can determine that a number of features identified for an entity of the plurality of entities is greater than a threshold. The network security monitor can, responsive to the determination, apply a linear dimensionality reduction technique to reduce the number of features for the entity. The network security monitor can generate the feature set for the entity using the reduced number of features. The linear dimensionality reduction technique can include at least one of a principal component analysis, kernel principal component analysis, or graph-based kernel principal analysis technique.

The network security monitor can weight the plurality of features for each of the plurality of entities. The network security monitor can generate the feature set for each of the plurality of entities using the weighted plurality of features. The feature set can correspond to a data point in a multidimensional space.

The network security monitor can form the plurality of clusters of entities using a density-based spatial clustering technique. The network security monitor can form the plurality of clusters of entities using a dynamic clustering technique and at least two density-based spatial clustering techniques.

In some embodiments, the plurality of entities include internal internet protocol addresses ("IPs), external IPs, autonomous system numbers, domains, electronic mail, or devices. In some embodiments, the plurality of features can correspond to at least one of traffic related counters, security related counters, policy violations, alerts-related counters, device identifiers, or organization, identifiers.

The network security monitor can determine to generate the alert for the entity absent an attack on the entity being detected during a time interval. The network security monitor can transmit the alert for the entity, the alert comprising an indication to disable the entity, reset the entity, or apply a software patch to the entity.

At least one aspect is directed to a system for threat detection in a network. The system can include a network security monitor that includes one or more hardware processors and memory. The network security can include a data collector, feature generator, cluster generator, classifier, and threat mitigator. The data collection component can be configured to obtain a plurality of records for a plurality of entities that access a network. The plurality of records can include attributes associated with the plurality of entities. The feature generator can be configured to identify a plurality of features for each of the plurality of entities based on the attributes of each of the plurality of entities. The feature generator can generate a feature set for each of the plurality of entities. The feature set can be generated from the plurality of features identified based on the attributes of each of the plurality of entities. The cluster generator can be configured to form a plurality of clusters of entities based on the feature set for each of the plurality of entities. The classifier can be configured to classify each of the plurality of clusters with a threat severity score calculated based on scores associated with entities forming each of the plurality of clusters. The threat mitigator can be configured to determine to generate an alert for an entity in a cluster of the plurality of clusters responsive to the threat severity score of the cluster being greater than a threshold.

In some embodiments, the network security monitor can aggregate in a time context the attributes associated with the plurality of entities. The network security monitor can aggregate the attributes using at least one of an average, sum, count, unique count, minimum value or maximum value. The network security monitor can identifying the features based on the aggregated attributes.

The network security monitor can transform the plurality of features for each of the plurality of entities using at least one of a Logarithmic function, exponential function, or root function. The network security monitor can generate the feature set for each of the plurality of entities using the transformed plurality of features for each of the plurality of entities.

The network security monitor can determine that a number of features identified for an entity of the plurality of entities is greater than a threshold. The network security monitor can, responsive to the determination, apply a linear dimensionality reduction technique to reduce the number of features for the entity. The network security monitor can generate the feature set for the entity using the reduced number of features. The linear dimensionality reduction technique can include at least one of a principal component analysis, kernel principal component analysis, or graph-based kernel principal analysis technique.

The network security monitor can weight the plurality of features for each of the plurality of entities. The network, security monitor can generate the feature set for each of the plurality of entities using the weighted plurality of features. The feature set can correspond to a data point in a multidimensional space.

The network security monitor can form the plurality of clusters of entities using a density-based spatial clustering technique. The network security monitor can form the plurality of clusters of entities using a dynamic clustering technique and at least two density-based spatial clustering techniques.

In some embodiments, the plurality of entities include internal internet protocol addresses ("IPs), external IPs, autonomous system numbers, domains, electronic mail, or devices. In some embodiments, the plurality of features can correspond to at least one of traffic related counters, security related counters, policy violations, alerts-related counters, device identifiers, or organization identifiers.

The network security monitor can determine to generate the alert for the entity absent an attack on the entity being detected during a time interval. The network security monitor can transmit the alert for the entity, the alert, comprising an indication to disable the entity, reset the entity, or apply a software patch to the entity.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for a network security monitor.

A. Computing and Network Environment

Figure 1A:
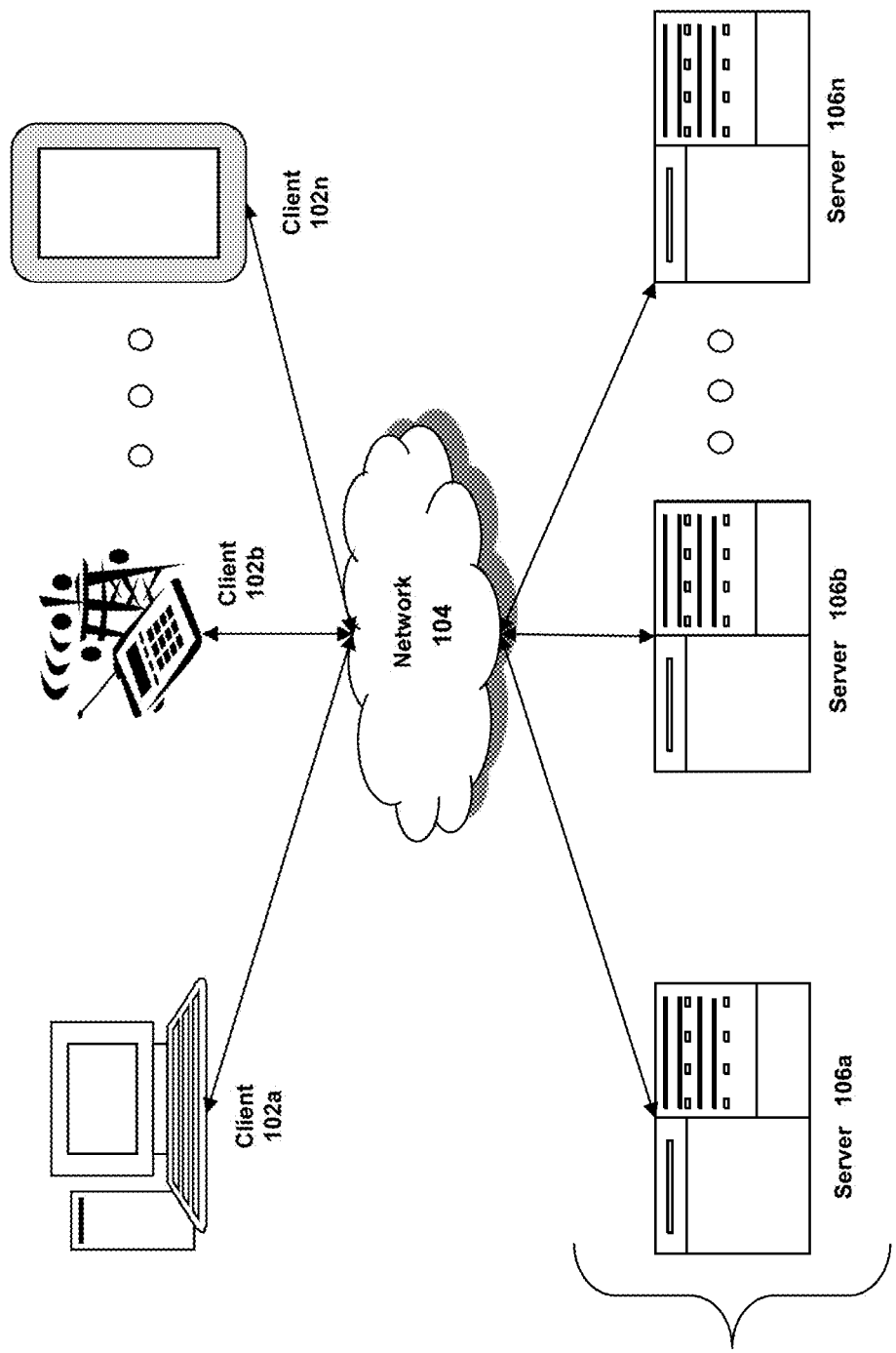
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computers) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by international Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and can include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 104 may be a type of a broadcast network, a telecommunications network, a data communication network, or a computer network.

In some embodiments, the system can include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 100 in the same machine farm 38. Thus, the group of servers 106 logically grouped as a machine farm 38 may be interconnected using a wide-area network (WAN) connection or a metropolitan-area network (MAN) connection. For example, a machine farm 38 can include servers 106 physically locate din different continents or different regions of a continent, country, state, city, campus, or room. Data transmission speeds between servers 106 in the machine farm 38 can be increased if the serves 106 are connected using a local-area network (LAN) connection or some form of direct connection. Additionally, a heterogeneous machine farm 38 can include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors can include VMware ESX/ESXi, manufactured by VMWare, Inc., of Palo Alto, Calif.; the Xen hypervisor, an open source product whose development in overseen by Citrix Systems, Inc.; the HYPER-V hypervisors provided by Microsoft or others. Hosted hypervisors may run within an operating system on a second software level. Examples of hosted hypervisors can include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
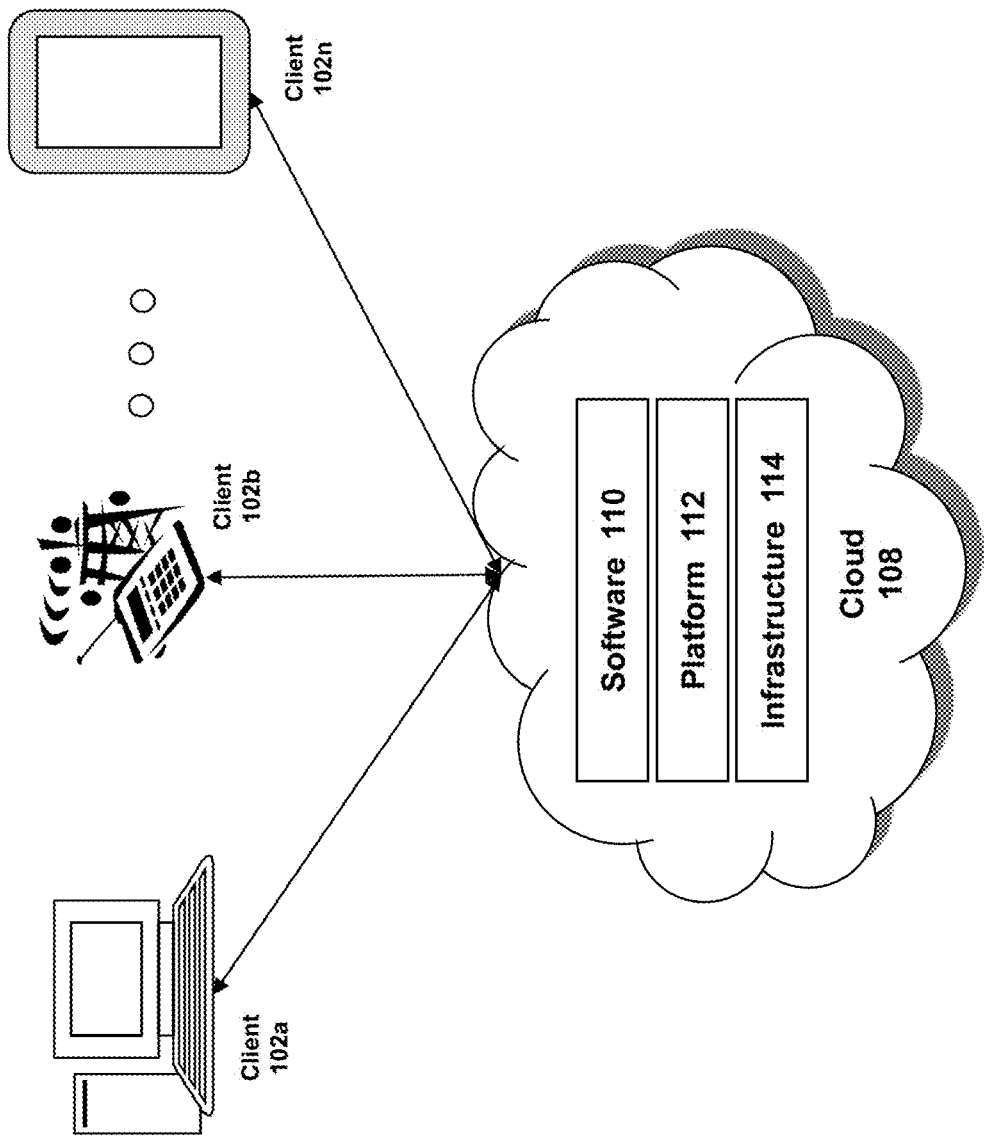
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment can include one or more clients 102a-102n, in communication with the cloud 108 over one or more networks 104. Clients 102 can include, e.g., thick clients, thin clients, and zero clients. A thick client may provide at least some functionality even when disconnected from the cloud 108 or servers 106. A thin client or a zero client may depend on the cloud 108 or other networks 104 or servers 106 to retrieve operating system data for the client device. The cloud 108 can include back end platforms, e.g., servers 106, storage, server farms or data centers.

The cloud 108 may be public, private, or hybrid. Public clouds can include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds can include private servers 106 that are physically maintained by clients 102 or owners of clients. Private clouds may be connected to the servers 106 over a private network 104. Hybrid clouds 108 can include both the private and public networks 104 and servers 106.

The cloud 108 may also include a cloud based delivery, e.g., Software as a Service (Saas) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google app Engine provided by Google, Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google In, SALESFORCE provided by Salesforce.com Inc. of San Francisco, Calif., or OFFICE 365 provided by Microsoft Corporation. Examples of SaaS may also include data storage providers, e.g., DROPBOX provided by Dropbox, Inc., of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or simple Object access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APLs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys can include various encryption standards such as e.g., Advanced Encryption Standard (AES). Data resources may be sent over Transport Layer Security (TLS) or Secure Sockets Layer (SSL).

Figure 1C:
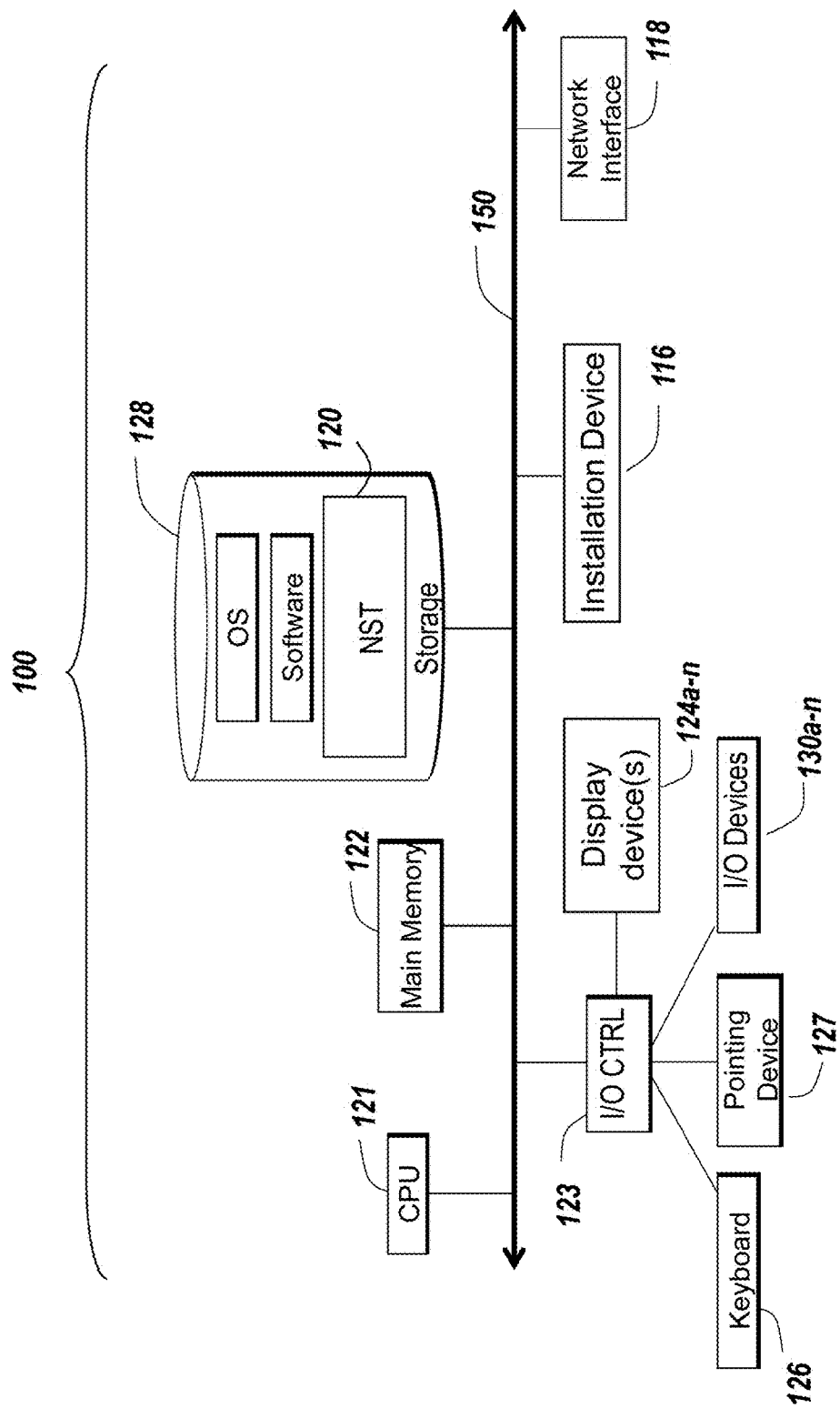
FIGS. 1C and 1D are block diagrams depicting embodiments of computing devices useful in connection with the methods and systems described herein.
Figure 1D:
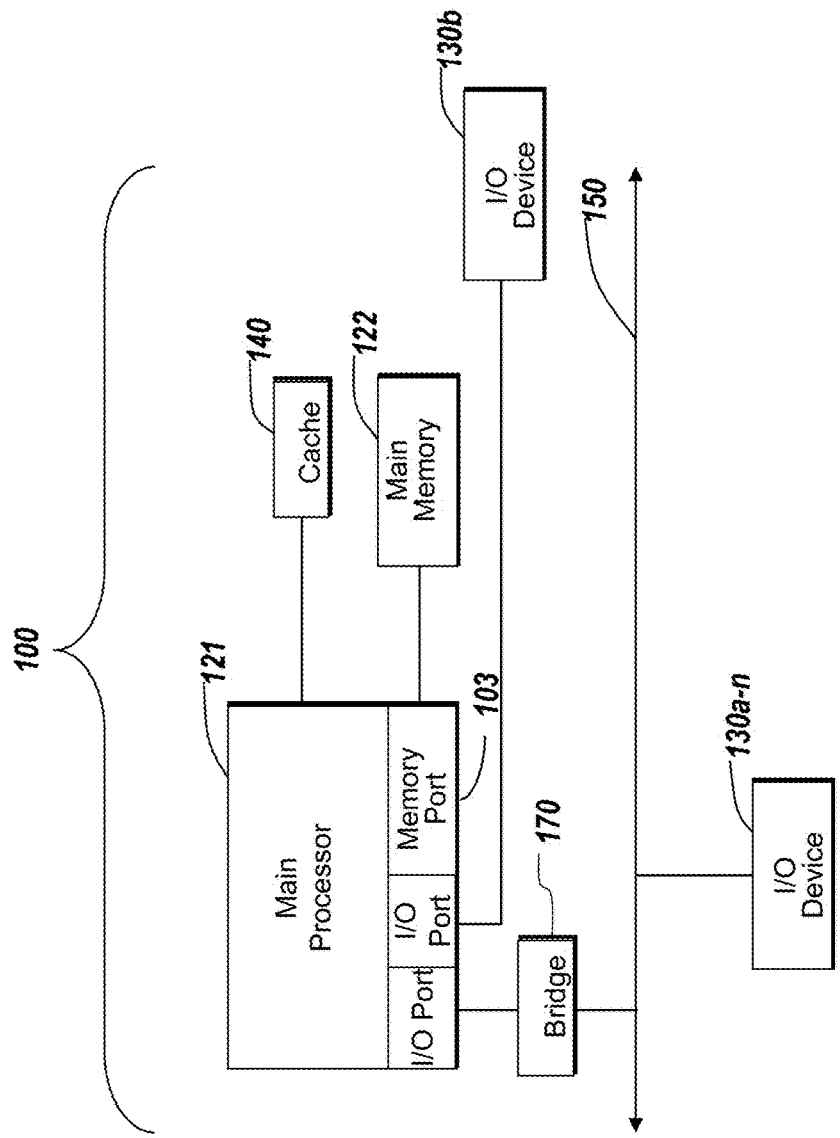

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 can include a storage device 128, an installation device 116, a network interface 118, an I/O controller 123, display devices 124a-124n, a keyboard 126 and a pointing device 127, e.g. a mouse. The storage device 128 can include, without limitation, an operating system, software, and a software of a network security monitor (NSM) 120. As shown in FIG. 1D, each computing device 100 may also include additional optional elements, e.g., a memory port 103, a bridge 170, one or more input/output devices 130a-130n (generally referred to using reference numeral 130, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plans, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor can include two or more processing units on a single computing component. Examples of multi-core processors include the AMD PHENOM IIX2, INTEL CORE i5 and INTEL CORE i7.

Main memory unit 122 can include one or more memory chips capable of storing data and allowing any storage location to be directly accessed by the microprocessor 121. Main memory unit 122 may e volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), enhanced DRAM (EDRAM), Extended Data Output RAM (EDO RAM), Extended Data Output DRAM (EDO DRAM), Burst Extended Data Output RAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (PRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100, Input devices can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, Inkjet primers, laser printers, and 3D printers.

Devices 130a-130n can include a combination of multiple input or output devices, including e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capacities, including, e.g., haptic feedback devices, touch-screen display, or multi-touch displays. Touchscreen, multi-touch displays, touchpads, touch ice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-24n or group of devices may be augment reality devices. The I/O devices 130a-130n, display devices 124a-24n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing derive 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplied optical shutter (TMOS) display, or 3D display. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX PI or other graphics libraries.

In some embodiments, the computing device 100 can include or connect to multiple display devices 124a-124n, which each may be of the same or different type and/or form. As such, any of the I/O devices 130a-130n, and/or the I/O controller 123 can include any type and/or form of suitable hardware, software, or combination of hardware and software to support, enable or provide for the connection and use of multiple display devices 124a-124n by the computing device 100. For example, the computing device 100 can include any type and/or form of video adapter, video card, driver, and/or library to interface, communicate, connect or otherwise use the display devices 124a-124n. In one embodiment, a video adapter can include multiple connectors to interface to multiple display devices 123a-124n. In other embodiments, the computing device 100 can include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the network security monitor. Examples of storage device 128 include, e.g., hard disk drive (HDD); optical device including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform can include a repository of applications on a server 106 or a cloud 108, which the clients 124a-124n may access over a network 104. An application distribution platform can include application developed and provided by various developers. A user of a client device 102 may select, purchase and/or download an application via the application distribution platform.

Furthermore, the computing device 100 can include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/ac CDMA, GSM, WiMax and direct asynchronous connections). In one embodiment, the computing device 10 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. of Ft. Lauderdale, Fla. The network interface 118 may comprise a build-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g., Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations describe herein. In some embodiments, the computing device 100 may have different processors, operating systems, and input devices consistent with the device. The Samsung GALAXY smartphone, e.g., operate under the control of Android operating system developed by Google, Inc. GALAXY smartphone receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. The IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g., a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine can include an identification of load information (e.g., the number of processes on the machine, CPU and memory utilization), of port information (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Network Security Monitor

The present disclosure relates generally to a network security monitor that performs behavioral clustering to detect threats in a computer network or network infrastructure. In network infrastructure that can include one or more distributed or centralized entities (e.g., network nodes, network elements, network components, or networked devices), it may be challenging to obtain or collect information from each of the network entities. It may be challenging to collect information (or the same information) from one or more network entities for various reasons, such as the network entity may be offline, damaged, busy processing other requests, improperly configured, or compromised. It may be challenging for the network security monitor to detect or determine threatful behavior corresponding to a network entity without collecting information from the network entity. Thus, it may be challenging to determine or detect threatful behavior with partial information from the network infrastructure.

Systems and methods of the present solution provide a network security monitor than can use one or more behavioral clustering techniques to group behaviors of entities that have a similar behavior. The network security monitor can further assign to the entities a threat severity score according to the group in which they are clustered based on their behavior. Entities can include, for example, internal internet protocol addresses ("IPs", external IPs, autonomous system numbers ("ASN"), domains, emails and devices. The network security monitor can determine that an entity that belongs to a group of threatfull (or threatening or a security risk) entities is likely (e.g., has a likelihood or probability greater than a threshold) to be also threatful, and an entity that belongs to a group of non-threatfull entities is likely to be also non-threatfull.

The network security monitor can first query data stores associated with the network infrastructure to create features for the entities that will be used for clustering. To obtain the features, the network security monitor can normalize and parse raw logs. The network security monitor can then extract aggregated attributes from the normalized and parsed raw logs about several entities in appropriate time context. The aggregated attributes that are used during the whole process could be averages, sums, counts, unique counts and min/max values. The network security monitor can transform features using for example, logarithmic functions, exponential functions, or root functions. For example, if the entities that would be clustered were internal IPs, there would be the following feature categories:

Traffic related counters (e.g., sessions, emails, unique countries, unique ports)
  Security related counters (e.g., spam mails, number of threats, number of unique threats, failed login attempts)
  Policy violations (e.g., firewall blocks)
  Alerts-related counters (e.g., private threat database occurrences, feedback from the administrator)
  Raw categorical-feature like device id, organization identifier, ASN, etc.

The network security monitor can transform the features. The network security monitor can further scale or standardize the features. The network security monitor can create a feature set for each entity which can correspond to a data point (e.g., a data point in a multidimensional space) corresponding to a behavior of the entity. Behavior can refer to a collection of raw logs or aggregated attributes.

The network security monitor can weight the features. For example, the network security monitor can obtain predetermined or pre-established weights from an administrator of the network security monitor, crowd sourced, experts, a data file or another source. The network security monitor can multiply or otherwise combine the weight with the corresponding features, to create a resulting dataset with weighted features. Weights can be used because some of the features may be more important (or influential) than others based on intuition or experts input. This importance can be translated at the "weight" of the features. The network security monitor can take the weight into account when determining to generate an alert for an entity or device.

In some cases, the network security monitor can apply a linear dimensionality reduction technique (e.g., principal component analysis ("PGA"), kernel PCA, graph-based kernel PCA) to the dataset (e.g., the dataset having the weighted features). For example, if there are greater than a threshold number of features-dimensions, then the network security monitor can apply a dimension reduction technique. The threshold number of features can be 20, 20, 40, 50, 60, 70 or other threshold. The technique facilitates creating orthogonal linear combinations of features. Applying the dimension reduction technique can improve processing speeds, reduce memory utilization, reduce resource utilization in downstream processing. The network security monitor can reduce the dimensions of the dataset to create a reduced dataset.

The network security monitor can apply one or more clustering techniques to the dataset (e.g., the reduced dataset having fewer dimensions) to create a clustered dataset. Clustering techniques can include, for example, dynamic clustering, density-based spatial clustering ("DBSCAN"), or hierarchical density-based spatial clustering ("HDBSCAN").

Clusters can refer to groups of records that are closely similar to each other in a high dimensional space. Each group can contain records that are similar to each other. Each cluster can have a minimum number of records. Records that do not belong to any group are considered as outliers and form their own group. The network security monitor can use clustering techniques based on dynamic clustering and two density based clustering algorithms (DBSCAN and HDBSCAN). The network security monitor can perform dynamic clustering as follows:
  Shuffle the data points
  Select the distance metric based on Manhattan distance, Euclidian distance or cosine similarity. Choose a threshold for cluster assignment.
  Minimum data points: The number of data points in a cluster for a data point to be considered as a cluster data point (e.g., a cluster should have minimum 5 data points else all data points are considered as outliers). This includes the point itself.
  Create the first cluster with the first data point, which becomes the first cluster's center.
  Every time a data point is assigned to a cluster, update the cluster center as the mean of the data points vectors that belong to this cluster.
  The next data points are assigned to existing clusters based on predefined threshold or create their own clusters.
  When all data points are assigned to a cluster, choose the clusters with less than minimum data points and all of those clusters data points are considered as an outlier group.

The network security monitor can apply a non-linear dimensionality reduction technique to the clustered dataset to facilitate visualizing the performance of each clustering technique. Non-linear dimensionality reduction techniques can include, for example, stochastic neighbor embedding, t-distributed stochastic neighbor embedding ("t-SNE"), manifold sculpting, or other techniques. The network security monitor can be configured with a Barnes Hut t-SNE non-linear dimensionality reduction technique to visualize high dimensional data in 2-dimensions or 3-dimensions. The technique facilitates the application of appropriate transformations to features and visualize the effectiveness of each clustering algorithm. The network security monitor can apply weights to each clustering technique based on the performance of each clustering technique. The network security monitor can apply the weights in an offline process.

The network security monitor can determine the weighted geometric mean of each clustering technique's threat severity scores for each entity. A cluster's threat severity score can be calculate based on security related counters and assigned to each entity. Each clustering technique can produce a unique threat severity score for each cluster. The network security monitor can determine the final threat severity score of the cluster as a weighted geometric average of the threat severity scores of each clustering algorithm. The network security monitor can update the threat severity scores when clustering techniques are applied to the dataset. Threat severity scores can be calculated as the mean of current instance and previous instance. Depending on the time context, the network security monitor can save an appropriate list of threat severity scores. For example, if the time context is 1 hour, a list of last 24 hours threat severity scores are saved for each entity.

Thus, for each entity, the network security monitor can determine the weighted geometric mean of threat severity scores based on each clustering technique. The network security monitor can determine a confidence score of the dataset. To determine the confidence, the network security monitor can apply one or more linear functions depending on the number of data points, where each entity and its features are considered one data point. Confidence is a function of data points scaled from 0 to 1 and can be identical for all data points during the same clustering technique. The network security monitor can use a first linear function for [0,1000] data points and another linear function for [1000, 5000] data points. For more than 5000 data points, the network security monitor can set the confidence to 1. The network security monitor can use other ranges or thresholds and vary the linear functions.

The network security monitor can generate an alert for each entity based on the confidence score and threat severity score. For example, the network security monitor can generate an alert when:
  An entity exceeds a threat severity score (e.g., 0.5)
  An entity exceeds a threat severity score difference (e.g., 0.3)
  An entity that used to belong to a specific cluster for consequent time frames, changes cluster.
  An entity that used to belong to a cluster and now belongs to a group of outliers or vice versa.

The network security monitor can transmit or otherwise convey the alert to an administrator of the entity, device or organization. The network security monitor can disable the device, reset the device, apply a software patch to the device, or otherwise control or manipulate the device to mitigate the threat.

For example, an organization, such as a company university, agency or other organization, can establish or utilize network infrastructure. A network security monitor can monitor or receive network traffic on the network infrastructure. The network security monitor can receive logs of the network traffic or other network activity. The security monitor can apply behavioral clustering techniques to the internal IPs of the organization's logs. The network security monitor can apply the behavior clustering techniques based on a time interval, periodically, responsive to an instruction, or responsive to a condition, event or trigger. For example, the network security monitor can apply behavior clustering to the IPs every 1 hour, 30 minutes, 90 minutes, 2 hours, or other time interval.

In a first scenario, the network security monitor applies behavior clustering and forms a groups with IPs: [IP1, IP2, IP3, I4, IP5]. The network security monitor can determine that all 5 IPs have a similar behavior. The network security monitor can identify that IP1, IP2, IP3 and IP4 had at least one recorded threat event through their Intrusion Detection System ("IDS") during the last hour. The network security monitor can determine that the threat severity of the group is 4 (the IPs with at least one recorded threat event) divided by 5 (all the IPs of the group).

While no threat event was recorded for IP5, the network security monitor can also consider IP5 to be "threatful" with a threat severity score of 4/5=0.8, which is equal to its corresponding group. Based on this threat severity score, the network security monitor can generate an alarm for IP5 to notify an administrator or disable or patch the device associated with IP5, because its threat severity score of 0.8 is above a threat threshold (e.g., 0.5). The network security monitor may not trigger an alarm for IP1, IP2, IP3 and IP4. Instead, the network security can store their threat severity scores in a database for future use.

In a second scenario, the network security monitor applies behavior clustering and forms an outlier group (e.g., IPs that do not belong to any groups) with IPs: [IP1, IP2, IP3]. The network security monitor can determine that the 3 IPs in this outlier group do not have similar behaviors and do not form groups with other IPs. IP1 and IP3 may have had at least one recorded threat event trough their IDS during the last hour. The network security monitor can determine that the threat severity of the outlier group is calculated as 2 (the IPs with at least one recorded threat event) divided by 3 (all the IPs of the outlier group).

While no threat event was recorded for IP2, the network security monitor can consider IP2 as "threatfull" with a threat severity score of 2/3=0.67, which is equal to its corresponding group. The network security monitor can generate or trigger an alarm for IP2 to notify the administrator, because its threat severity score 0.67 was above a threat threshold (e.g., 0.5). The network security monitor may not trigger an alarm for IP1 and IP3, and my store their threat severity scores in a database for future use.

In a third scenario, the network security monitor applies behavior clustering and forms a group with IPs: [IP1, IP2, IP3, IP4, IP5]. The network security monitor can determine that all 5 IPs have similar behaviors. The network security monitor can determine that IP1 and IP2 had at least one recorded threat event through their IDS during the last hour. The network security monitor can determine the threat severity of the group as 2 (the number of IPs with at least one recorded threat event) divided by 5 (all the IPs of the group) to result in a threat severity score of 0.4.

The network security monitor may not have previously identified IP5 as "threatfull". Further, IP5 may have had a threat severity score equal to zero in the last 24 hours. IP5 may have been a part of a different group or cluster. Whilst no threat event was recorded about IP5, the network security monitor can determine IP5 is "threatfull" because of the difference between its previous threat severity score and its current threat severity score, which is equal to the group's threat severity score of 0.4. Responsive to the difference being greater than or equal to a threat difference threshold (e.g., 0.3), the network security monitor can generate an alarm for I5 to notify the administrator or otherwise control the device corresponding to IP5. The network security monitor may not trigger an alarm for IP1, IP2, IP3 and IP4, and store their threat severity scores in a database.

In a fourth scenario, the network security monitor applies behavior clustering and forms an outlier group (e.g., IPs that do not belong to any groups) with IPs: [IP1, IP2, IP3]. The network security monitor can determine that all 3 IPS do not have similar behaviors and do not form groups with other IPs. The network security monitor can identify that IP1 had at least on recorded threat event through their IDS during the last hour. The network security monitor can determine the threat severity of the outlier group as 1 (the IPs with at least one recorded threat event) divided by 3 (all the IPs of the outlier group) to equal 0.33.

The network security monitor can determine that IP2 was used to form groups with other IPs in the last 24 hours. While no threat event was recorded about IP2, the network security monitor can determine that IP2 is "threatfull" with a threat severity score of 1/3=0.33 equal to its corresponding group. The network security monitor can determine that IP2 is threatful because of the change in its behavior (e.g., IP2 used to belong to a different group, but is now considered as an outlier). The network security monitor can generate an alarm for IP2 to notify the administrator or otherwise control the device corresponding to IP2, because IP2 had an unusual behavior. The network security monitor may not generate an alarm for IP1 and IP3, and store their threat severity scores in the database for future use.

In a fifth scenario, the network security monitor applies behavior clustering and forms an outlier group with IPs: [IP1, IP2, IP3]. The network security monitor can determine that all 3 IPS do not have similar behaviors and do not form groups with other IPs. The network security monitor can determine that IP1 had at least one recorded threat event through their IDS during the last hour. The network security monitor can determine the threat severity of the outlier group as 1 (the number of IPs with at least one recorded threat event) divided by 3 (the number of IPs of the outlier group).

The network security monitor can determine that this is the first time logs are received about IP2. While no threat event was recorded about IP2, the networks security monitor can determine IP2 is also "threatfull" with a threat severity score of 1/3=0.33, which is equal to its corresponding group. The network security monitor can determine IP2 is threatful because it is considered as a "first seen" event that also had an "outlier" behavior. The network security monitor can generate an alarm for IP2 that notifies the administrator or otherwise controls the device associated with IP2, because IP2 is considered a "first seen" event. The network security monitor may not generate an alarm for IP1 and IP3, and store their threat severity scores in the database.

Figure 2:
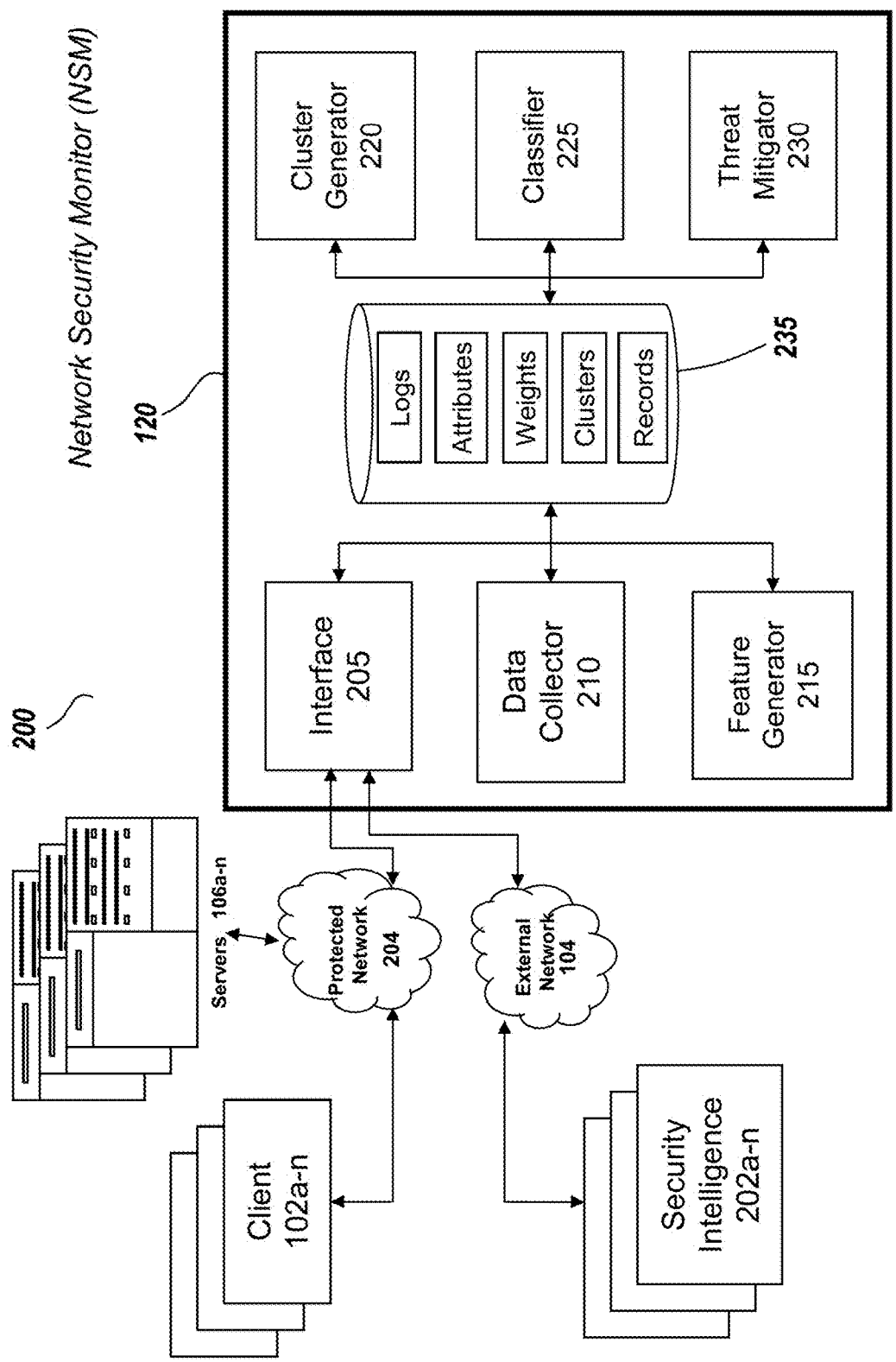
FIG. 2 is a block diagram depicting an embodiment of a system comprising a network security monitor.

Referring now to FIG. 2, a block diagram depicting an embodiment of a system 200 comprising a network security monitor is shown. In brief overview, the system 200 includes a network security monitor 120 ("NSM") that can receive and/or transmit data via a protected network 204 and/or an external network 104. The system can include one or more clients 102a-n and/or one or more servers 106a-n that access the protected network 204. The system can include or communicate with security intelligence repositories 202a-n, such as third-party threat intelligence providers, crowd sourced threat intelligence, etc. The network security monitor 120 can include an interface 205 that accesses the protected network 204 and external network 104. The interface 205 can also facilitate interactions or communication between one or more modules, engines, components or databases of the network security monitor 120. The network security monitor 120 can include a data collector 210 (or data collection component 210) that obtains logs (e.g., status information, raw logs) for network elements or entities (e.g., entities associated with IPs) in the protected network 204 or the external network 104. The network security monitor 120 can include a feature generator 215 that extracts and parses attributes from the raw logs collected by the data collector 210 to generate features, and applies weights to the features. The network security monitor 120 can include a cluster generator 220 that can generate groups (or clusters) of entities or IPs that are closely similar to each other. The network security monitor 120 can include a classifier 225 that can determine a threat severity score for the group and assign a threat severity score to one or more entities of the group. The network security monitor 120 can include a threat mitigator 230 to generate an alarm or control a device associated with an IP that is classified as a threat. The network security monitor 120 can include a database or data repository 235 that stores, in or more data structures or data files, including logs, attributes, features, weights, clusters, and records. The network security monitor 120 can generates a report based on whether or not at threat is detected in the networks 204 or 104, and communicate the report to a client 102a-n via the network 204 or 104 or other entity. The network security monitor 120 can, responsive to detecting the threat, control a function of the affected network entity or element. For example, the network security monitor 120 can, responsive to detecting the threat, disable the network element, restart the network element, reset the network element, repair the network element, patch or update the network element, or otherwise eliminate or remove the threat affecting the network element.

The network security monitor 120, interface 205, data collector 210, feature generator 215, cluster generator 220, classifier 225, threat mitigator 230, and database 235 can each include one or more processing units or other logic devices such as programmable logic array engines, modules, or circuitry designed and constructed to facilitate managing security on a network infrastructure. For example, the data collector 210 can be a data collection hardware and software component that includes hardware processors, memory, input/output ports, and software configured for collecting or obtain data to facilitate detecting and mitigating threats in a network. The feature generator 215 can be a feature generation hardware and software component that includes hardware processors, memory, input/output ports, and software configured for generating, identifying or extracting features from the obtained data in order to facilitate detecting and mitigating threats in a network. The cluster generator 220 can be a cluster generation hardware and software component that includes hardware processors, memory, input/output ports, and software configured for generating, grouping, categorizing, or identifying clusters of entities with similar behavior using the features generated from the obtained data in order to facilitate detecting and mitigating threats in a network. The classifier 225 can be a classification hardware and software component that includes hardware processors, memory, input/output ports, and software configured to determining, classifying or scoring entities or clusters of entities as threatful in order to facilitate detecting and mitigating threats in a network. The threat mitigator 230 can be a threat mitigation hardware and software component that includes hardware processors, memory, input/output ports, and software configured to mitigate, prevent, block, or reduce threats in a network.

In further detail, the network security monitor 120 includes an interface 205. The interface 205 can be designed and constructed to communicate via a protected network 204 or an external network 104. A protected network 204 may refer to a private network, e.g., a network that the network security monitor 120 is attempting to monitor or protect. For example, this network may refer to an internal network, or intranet, of a company, organization, university, or other entity. The interface 205 may be designed and constructed to communicate via an external network 104, such as the World Wide Web or Internet. The interface 205 may facilitate interaction or communication between one or more modules or components of, or associated with, the tool 120, such as the data collector 210, feature generator 215, cluster generator 220, classifier 225, threat mitigator 230, and database 235. The interface 205 may directly interface with the modules or networks 104 and 204, or the interface may communicate with the modules or networks via an intermediary device, application program interface, input/output device, etc.

The network security monitor 120 can include a data collector 210 designed and constructed to obtain logs or records, aggregate records, or identify attributes or values of the records. The data collection component can obtain record for entities that access the network (e.g., network 204 or network 104). The records can include attributes associated with the entities. The records can include or refer to logs. The data collector 210 can receive the logs via interface 205 or another interface of the data collector 210. The data collector 210 can receive the logs securely from the protected network 204 (e.g., an encrypted network, password protected network, access restricted network, time restricted network, etc.). The data collector 210 may receive, request, retrieve or obtain logs from the protected network 204 that indicate a status of the protected network. The logs may indicate network activity on the protected network 204 including, e.g., threats, traffic, email, performance authentication, authorization and accounting (AAA), VPN, and access control information. Each log may have a log identifier and indicate information associated with the network activity such as device identifiers, time stamps, domains, level of severity of the log event, source port of the session, source internet protocol (IP) of the session, destination IP of the session, reference URL, etc. Tables 1-8 are an illustrative example of the type of information that can be obtained or determined by the data collector 210 to provide the records or attributes or values.

The data collector 210 can obtain the logs based on a time interval. In some embodiments, the data collector 210 may continuously receive logs in real-time, e.g., as logs are created. In some embodiments, the data collector 210 may receive the logs based on a time interval or in a batch process (e.g., multiple logs stored in one or more data files. For example, the data collector 210 may receive logs hourly, every 12 hours, every 24 hours, weekly, every two weeks, or another time interval set by an administrator of the network security monitor 120 that facilitates managing the security of the protected network 204. In some embodiments, the network security monitor 120 e.g., via the data collector 210, may receive logs responsive to a request for logs.

The data collector 210 may request logs from an agent executing on the protected network 203, such as a monitoring agent. A monitoring agent can execute on a server 106a-n of the protected network 204, or client 102a-n. The monitoring agent can include, for example, an antivirus took, a network security element, an intrusion prevention system, or an intrusion detection system. In some embodiments, the data collector 210 may obtain network information or logs from a vulnerability assessment tool (e.g., Open Vulnerability Assessment System ("Open VAS"), which can include a framework of several services and tools offering a vulnerability scanning and vulnerability management solution. The monitoring agent may create one or more types of logs including, e.g., general system logs, network security logs, intrusion prevention system legs, intrusion detection system logs, or an antivirus application log.

The logs received by the data collector 210 may be in any format that provides information on network activity of the protected network 204. In some embodiments log files can include plain text files, comma-delimited files, binary files, spreadsheets, etc. for example, a test file may be comma-delimited to reflect headers for each column in the log file. In some embodiments, depending on the monitoring agent, the monitoring agent may create a log folder that contains a series of logs files, one file for each day of log entries. The log files may be named MMDDYYYY.log, where MMDDYYYY indicates the data of the log entries.

In some embodiments, the monitoring agent may store log files in a predetermined directory of a server or client of the protected network. The data collector 210 may access the predetermined directory based on a time interval (e.g., periodically, upon request, or some other time interval) to determine whether there are new or updated logs that can be retrieved. In some embodiments, the data collector 210 may retrieve or receive the logs, and store the logs in database 235. The data collector 210 may store all previous logs, aggregate logs based on type, or delete the logs after a time period (e.g., 24 hours, 48 hours, a week, month, year, etc.).

The network security monitor can normalize or organize the logs obtained by the data collector 210. The logs can include different types of logs generated by the protected including, but not limited to, general system logs, network security logs such as those generated by IPSs and IDSs, and logs generated by anti-virus applications. The data collector 210 can organize the logs in a manner that facilitates comparing the logs to extensive lists of threat indicators in order to determine whether or not the protected network is currently infected by an advanced persistent threat (APT). By indexing the logs provided to the network security monitor, the network security monitor 120 can achieve greater efficiency by comparing logs to the appropriate lists of potential threat indicators, thereby reducing the amount of computing resources consumed by the network security monitor during operation.

The data collector 210 can index the logs based on threat indicators. The data collector 210 can be configured with a log normalizations schema that allows the data collector 210 to organize different types of logs obtained from different types of devices, collectors, tools, applications, or monitoring agents. Since each monitoring agent may use a different type of log representation, indexing all the received logs using a common log format or schema can improve the efficiency of the log correlation engine 225.

The data collector 210 can parse, analyze, or otherwise process received logs to determine a type of log (e.g., threat log, email log, traffic log, authentication log, etc.), and one or more parameters or fields associated with the log. The data collector 210 can then index the log based on the type of log (e.g., threat log), and organize the data or parameters associated with the log using a log format or schema. The data collector 210 may index historical logs that were not previously indexed, as well as new logs received by the data collector 210. The data collector 210 may index logs in real-time as they arrive, or the data collector 210 may index logs in a batch process run based on a time interval (e.g., hourly, daily, weekly, or some other time period that facilitates managing security of the network).

The following tables 1-8 illustrate embodiments of a log format or schema used by the data collector 210 to organize, index, or normalize the logs received by the data collector 210 or stored in the database 235. The data collector 210 may use different formats or schema based on the type of log. The data collector 210 may apply this format or schema for all received logs corresponding to the same type. For example, table 1 illustrates an embodiment of a log format or schema for mapping received logs to indexed threat logs; table 2 illustrates an embodiment of a log format or schema for mapping received logs to indexed traffic logs; table 3 illustrates an embodiment of a log format or schema for mapping received logs to indexed email logs; table 4 illustrates an embodiment of a log format or schema for mapping received logs to indexed performance logs; table 5 illustrates an embodiment of a log format or schema for mapping received logs to indexed AAA (authentication, authorization and accounting) logs; table 6 illustrates an embodiment of a log format or schema for mapping received logs to indexed VPN logs; table 7 illustrates an embodiment of a log format or schema for mapping received logs to indexed access control logs; table 8 illustrates an embodiment of a log format or schema for that are used for mapping one or more types of logs.

TABLE 1

Threat Log Mapping

| Field Name | Field Description |
|---|---|
| @timestamp | Time stamp of the event |
| Devname | ID of the device |
| Devid | Name of the device |
| Domain | Name of the virtual device |
| Logid | ID of the event |
| Type (threat) | Type of the event |
| Subtype (anomaly, virus, signature) | Subtype of the event |
| level | Severity of the event |
| srcport | Source port of the session |
| srcip | Source IP of the session |
| srcintf | Source interface of the session |
| dstintf | Destination interface of the session |
| dstip | Destination IP of the session |
| dstport | Destination port of the session |
| service | Service of the session |
| sessionid | Session ID |
| policyid | Identification number of the policy |
| identidx | Authentication policy ID |
| user | Identified user of the session |
| group | Identified user's group of the session |
| profile | Security profile that recognizes the threat |
| proto | |

TABLE 1-continued

Threat Log Mapping

| Field Name | Field Description |
| --- | --- |
| Status (blocked, passthrough, monitored, analytics, detected, dropped, reset) | Action performed for the current threat |
| attackname | Name of the threat |
| ref | Reference URL |
| file | Name of the file infected |
| checksum | Checksum of the file infected |
| quarskip | Quarantine action |
| url | Source URL of the threat (malware) |
| from | Sender's email address in case of threat through email |
| to | Recipient's email address in case of threat through email |
| severity | Severity of the threat |
| count | Number of packets |
| attackid | Identification of the threat |
| incidentserialno | Incident serial number |

TABLE 2

Traffic log mapping

| Field Name | Field Description |
| --- | --- |
| @timestamp | Timestamp of the event |
| Devname | Name of the system |
| Devid | Unique identification number of the system |
| Logid | Log identification number |
| Type | Type of the event value: traffic |
| Subtype | Subtype of the event |
| Domain | Virtual domain of the system |
| Level | Severity of the event |
| Srcport | Source port of the session |
| Srcip | Source IP of the session |
| Srcintf | Source interface of the session |
| Dstintf | Destination interface of the session |
| Dstip | Destination IP of the session |
| Dstport | Destination port of the session |
| Srccountry | Source country |
| Dstcountry | Destination country |
| Policyid | Identification number of the security policy traffic passthrough |
| Identidx | Identify-based policy identification number |
| Sessionid | Serial number of the session |
| Service | Service of the session |
| User | Identified user of the session |
| group | Identified user's group of the session |
| applist | Application sensor that recognizes the application |
| status | Status of the traffic session |
| appid | Identification number of the application |
| app | Name of the application |
| appcat | Category of the application |
| duration | Duration of session in seconds |
| sentbyte | Number of sent bytes |
| rcvdbyte | Number of received bytes |
| totalbytes | Total bytes |
| sentpkt | Number of sent packets |
| rcvdpkt | Number of received packets |
| trandisp | Type of NAT |
| tranip | Translated IP in NAT mode |
| transip | Translated source IP in NAT mode |
| tranport | Translated port |
| transport | Translated source port |
| proto | IP protocol |

TABLE 3

Email log mapping

| Field Name | Field Description |
| --- | --- |
| @timestamp | Timestamp of event |
| Devid | ID of the device |
| Devname | Name of the device |
| Domain | Name of the virtual device |
| Logid | ID of the event |
| Type (email) | Type of the event |
| Subtype (spam regular) | Subtype of the event |
| level | Severity of the event |
| srcport | Source port of the session |
| Srcport | Source port of the session |
| Srcip | Source IP of the session |
| Srcintf | Source interface of the session |
| Dstintf | Destination interface of the session |
| Dstip | Destination IP of the session |
| Dstport | Destination port of the session |
| service | Service of the session |
| sessionid | ID of the session |
| policyid | ID of the policy |
| identidx | ID of the identification policy |
| user | Name of the user |
| group | Name of the group to which user belongs |
| profile | Name of the security profile |
| Status (detected, blocked, exempted) | Status of the action taken |
| from | Sender of the email |
| to | Recipient of the email |
| msg | Information related to the spam mechanism |
| subject | Subject of the email |
| size | Size of the email |
| cc | CC of the email |
| Attachment (yes, no) | Whether the email includes an attachment |

TABLE 4

Performance log mapping

| Field Name | Field Description |
| --- | --- |
| @timestamp | Timestamp of event |
| Devid | ID of the device |
| Devname | Name of the device |
| Domain | Name of the virtual device |
| Logid | ID of the event |
| Type (perf) | Type of the event |
| Subtype (sys) | Subtype of the event |
| cpu | Percentage of CPU usage |
| mem | Percentage of memory usage |
| totalsession | Total number of system's sessions |

TABLE 5

AAA (authentication, authorization and accounting) log mapping

| Field Name | Field Description |
| --- | --- |
| @timestamp | Timestamp of the event |
| Devname | Unique identification number of the system |
| Devid | Log identification number |
| Logid | Type of the event (value: traffic) |
| Type (aaa) | Subtype of the event |
| Subtype (authen, author, acc) | Virtual domain of the system |
| domain | Virtual domain of the system |
| level | Severity of the event |
| Scope (local, ssl-web) | Authentication scope |
| Action (login, logout) | Action |

TABLE 5-continued

AAA (authentication, authorization and accounting) log mapping

| Field Name | Field Description |
|---|---|
| srcport | Source port of the session |
| dstport | Destination port |
| srcip | Source IP |
| Status (success, failed) | Whether the AAA succeeded or failed |
| profile | User profile |
| duration | Duration |
| reason | Reason for failure |
| user | User |
| group | Group |
| tunnelid | Identification of the tunnel |

TABLE 6

VPN log mapping

| Field Name | Field Description |
|---|---|
| @timestamp | Timestamp of the event |
| @id | Identification of the event |
| logid | Log identification number |
| Level | Severity of the event |
| Type (vpn) | Type of the event (value: traffic) |
| Subtype (ssl, ipsec) | Subtype of the event |
| devid | Unique identification number of the system |
| devname | Name of the system |
| vdev | Virtual domain of the system |
| tunnelid | Tunnel ID |
| remoteip | Remote IP |
| tunnelip | Tunnel IP |
| Status (up, down) | |
| user | User |
| group | Group |
| sentybte | Sent byte |
| rcvdbyte | Receive byte |
| duration | Duration |
| reason | Reason |
| tunneltype | Tunnel type |

TABLE 7

Access Control log mapping

| Field Name | Field Description |
|---|---|
| @timestamp | Timestamp of the event |
| devname | ID of the device |
| devid | Name of the device |
| domain | Name of the virtual device |
| logid | ID of the event |
| Type (acc, ctrl) | Type of the event |
| Subtype (app web) | Subtype of the event |
| level | Severity of the event |
| srcport | Source port of the session |
| srcip | Source IP of the session |
| Srcintf | Source interface of the session |
| Dstintf | Destination interface of the session |
| Dstip | Destination IP of the session |
| Dstport | Destination port of the session |
| Service | Service of the session |
| Sessionid | ID of the session |
| Policyid | ID of the security policy |
| Identidx | ID of the identification policy |
| User | Identified user of the session |
| Group | Identified user's group of the session |
| profile | Security profile that catches the application |
| proto | Protocol number in IPv4 packets |
| Status (pass, block, reset, reject, | Status of the action taken |

TABLE 7-continued

Access Control log mapping

| Field Name | Field Description |
|---|---|
| passthrough, monitor) | |
| app | Application name |
| appid | Application ID |
| count | Number of packets |
| hostname | Hostname of the destination |
| url | URL of the destination |
| Reqtype (direct, referral) | HTTP request type |
| method | Method use |
| sentbyte | Sent bytes |
| rcvdbyte | Received bytes |
| cat | Category of the application0 |
| catdesc | Description of the category |

TABLE 8

Accumulated Standard fields mapping

| Category | Field Description |
|---|---|
| Standard fields (always present) | @timestamp<br>@id<br>@srcevent<br>Devid<br>Logid<br>Type<br>Subtype<br>Level |

In some embodiments, an exploit refers to a piece of software, a chunk of data, or a sequence of commands that takes advantage of a bug or vulnerability in order to cause computer software and/or hardware to have unintended or unanticipated behavior. Such behavior may aim to gain control of a system, allowing privilege escalation, or a denial-of-service attack. Signatures can refer to attack patterns that are used by the tool. The signatures, or patterns, specify attacks in a network, a network node, a networked device, at a host level. The network security monitor 120 can aggregate and store the threat intelligence in a database infrastructure 235 (e.g., file server, file system) using a threat intelligence schema/format for organizing and making the aggregated threat intelligence manageable and maintainable.

The network security monitor 120 can organize, normalize, process, transform, or otherwise analyze the threat intelligence obtained by the cluster generator 220 (or stored in database 235) to generate a list of threat indicators. In some embodiments, normalizing the threat intelligence data can include de-duplicating redundant data and/or transforming the threat intelligence data into a structured list of threat indicators corresponding to a threat scheme (or log format schema). The network security monitor 120 can generate the list of threat indicators based on a schema for threats (e.g., threat schema or threat intelligence schema). The schema used by the network security monitor 120 organizes the aggregated threat intelligence and makes the threat intelligence database manageable and maintainable. The threat intelligence schema/format can be applied to threat indicators aggregated from different private and open source threat intelligence repositories including, (e.g., Internet Protocol address, a malware code sample, a malicious code sample, or an intrusion prevention system signature) to be structured and expressed as a list of threat indicators to allow the log correlation engine 225 to identify a threat.

The network security monitor 120 can include a feature generator 215 to generate one or more features from the raw logs obtained from the data collector 210. In some cases, the data collector 210 can at least partially parse and process the raw logs. In some cases, the feature generator 215 receives at least partially parsed and processed logs. The feature generator 215 can identify features for each of the entities based on the attributes of each of the entities. The feature generator 215 can generate a feature set for each of the entities. The feature set can be generated from the features identified based on the attributes of each of the plurality of entities.

For example, the feature generator 215 (or data collector 210) can query the database 235 to obtain logs for entities corresponding to IP addresses or other identifiers. The feature generator 215 can create features for the entities to be used for clustering. To obtain the features, the feature generator 215 (or data collector 210) can normalize and parse raw logs. The network security monitor 120 can then extract aggregated attributes from the normalized and parsed raw logs about several entities in appropriate time context. The network security monitor 120 can aggregate in a time context the attributes associated with the plurality of entities using at least one of an average, sum, count, unique counts, minimum value or maximum value. The network security monitor 120 can identify the features based on the aggregated attributes. The aggregated attributes that are used during the whole process could be averages, sums, counts, unique counts and min/max values. The network security monitor 120 can transform features using, for example, logarithmic functions, exponential functions, or root functions. The network security monitor 120 can transform the features for each of the entities using at least one of a logarithmic function, exponential function, or root function, and then generate the feature set for each of the entities using the transformed features for each of the plurality of entities. For example, if the entities that would be clustered were internal IPs, the network security monitor 120 can use the following feature categories:

Traffic related counters (e.g., sessions, emails, unique countries, unique ports)

Security related counters (e.g., spam mails, number of threats, number of unique threats, failed login attempts)

Policy violations (e.g., firewall blocks)

Alerts-related counters (e.g., private threat database occurrences, feedback from the administrator)

Raw categorical-features like device id, organization identifier, ASN, etc.

Feature categories can be stored in database 235, and the feature generator 215 can retrieve or select feature categories based on the type of data (e.g., internal IPs, external IPs, device names, MAC addresses, usernames, or other data).

The network security monitor 120 can transform the features. The network security monitor 120 can further scale or standardize the features. The network security monitor 120 can create a feature set for each entity which can correspond to a data point corresponding to a behavior of the entity. Behavior can refer to a collection of raw logs or aggregated attributes.

The network security monitor 120 can weight the features. The network security monitor 120 can weight the feature for each of the entities. The network security monitor 120 can generate the feature set for each of the entities using the weighted features, where the feature set corresponds to a data point in a multidimensional space. For example, the network security monitor 120 can obtain predetermined or pre-established weights from an administrator of the network security monitor, crowd sourced, experts, a data file or another source. The network security monitory 120 can multiply or otherwise combine the weight with the corresponding features, to create a resulting dataset with weighted features. Weights can be used because some of the features may be more important (or influential) than others based on intuition or experts input. This importance can be translated as the "weight" of the features. The network security monitor can take the weight into account when determining to generate an alert for an entity of device.

The network security monitor 120 can apply weights to important features or attributes or values of the data collected and aggregated by the data collector 210. For example, the data collected and analyzed by the network security monitor can include many attributes. Some of these aggregated attributes may be more important (or influential) than others. This importance can be translated as the "weight" of the attribute (or variable). The network security monitor 120 can assign weights to the attributes to indicate the importance of the attribute.

The network security monitor 120 can use various weighting techniques to determine the importance of a feature, attribute or value and apply a corresponding weight. In some cases, the database 235 can store a weight data structure storing weights for one or more attributes. The weights can be predetermine. The weights can be received from an administrator or expert or crowd sourced. In some cases, the weights can be determined using a machine learning technique, such as a logistic regression technique that can generate or output weights that indicate a correlation between attributes and a threat or non-threat. For example, the machine learning technique can receive, as input, training data to output weights that can be applied during the network security monitor's 120 decision process. The weights can include numerical weights. The weights can range from 0 to 1, 0 to 10, 0 to 100, or any other numerical range that can indicate an importance of a value or attribute.

In some cases, the network security monitor 120 can apply a linear dimensionality reduction technique (e.g., principal component analysis ("PCA"), kernel PCA, graph-based kernel PCA) to the dataset (e.g., the dataset having the weighted features). The network security monitor 120 can determine that a number of features identified for an entity (or the total number of different features associated with the plurality of entities in the data set) is greater than a threshold. Responsive to the determination, the network security monitor 120 can apply a linear dimensionality reduction technique to reduce the number of features for the entity. The linear dimensionality reduction technique can include at least one of a principal component analysis, kernel principal component analysis, or graph-based kernel principal analysis technique. The network security monitor 120 can then generate the feature set for the entity using the reduced number of features.

For example, if there are greater than a threshold number of features-dimensions, then the network security monitor can apply a dimensions reduction technique. The threshold number of features can be 20, 30, 40, 50, 60, 70 or other threshold. The threshold can be stored in database 235 in a threshold data structure. The threshold can be a feature-dimension threshold. Applying a linear dimensionality reduction technique can facilitate creating orthogonal linear combinations of features. Applying the dimension reduction technique can improve processing speeds, reduce memory utilization, reduce resource utilization in downstream processing. The network security monitor 120 can reduce the dimensions of the dataset to create a reduced dataset.

The network security monitor can include a cluster generator 220. The cluster generator 220 can form clusters of entities based on the feature set for each of the plurality of entities. The cluster generator 220 can generate or identify clusters or groups and assign entities having identifiers (e.g., IPs) to the identified clusters or groups. Clusters can refer to groups of entities that are similar to each other. Each group can include an entity that are similar to each other. Each group can have a number of entities. If the number of entities in the group satisfies a minimum threshold, then the group may be considered a standard or normal group. If the number of entities is less than a threshold or minimum number of entities, then the group can be considered an outlier (e.g., the entities in the group can form a set of outliers).

The network security monitor 120 (e.g., via cluster generator 220) can apply one or more clustering techniques to the dataset (e.g., the reduced dataset having fewer dimensions) to create a clustered dataset. Clustering techniques can include, for example, dynamic clustering, density-based spatial clustering ("DBSCAN"), or hierarchical density-based spatial clustering ("HDBSCAN").

Clusters can refer to groups of records that are closely similar to each other in al high dimensional space. Each group can contain records that are similar to each other. Each cluster can have a minimum number of records. Records that do not belong to any group are considered as outliers and form their own group. For example, the network security monitor 120 can use clustering techniques based on dynamic clustering and two density based clustering algorithms (DBSCAN) and HDBSCAN). For example, the network security monitor 120 can perform dynamic clustering as follows:

Shuffle the data points
Select the distance metric based on Manhattan distance, Euclidian distance or cosine similarity. Choose a threshold for cluster assignment.
Minimum data points: The number of data points in a cluster for a data point to be considered as a cluster data point (e.g., a cluster should have minimum 5 data points else all data points are considered as outliers). This includes the point itself.
Create the first cluster with the first data point, which becomes the first cluster's center.
Every time a data point is assigned to a cluster, update the cluster center as the mean of the data points vectors that belong to this cluster.
The next data points are assigned to existing clusters based on predefined threshold or create their own clusters.
When all data points are assigned to a cluster, choose the clusters with less than minimum data points and all of those clusters data points are considered as an outlier group.

To facilitate visualizing the performance of each clustering technique, the network security monitor 120 can apply a non-linear dimensionality reduction technique to the clustered dataset to facilitate visualizing the performance of each clustering technique. Non-linear dimensionality reduction techniques can include, for example, stochastic neighbor embedding, t-distributed stochastic neighbor embedding ("t-SNE"), manifold sculpting, or other techniques. The network security monitor can be configured with a Barnes Hut t-SNE non-linear dimensionality reduction technique to visualize high dimensional data in 2-dimensions or 3-dimensions. The technique facilitates the application of appropriate transformations to features and visualize the effectiveness of each clustering algorithm. The network security monitor 120 can apply weights to each clustering technique based on the performance of each clustering technique. The network security monitor 120 can apply the weights in an offline process.

The network security monitor 120 can include a classifier 225 designed and constructed to classify the groups and entities of the groups. The classifier 225 can classify each of the clusters with a threat severity score calculated based on scores associated with entities forming each of the plurality of clusters. The classifier 225 can be configured with, one or more techniques to determine a threat severity score of the group or an entity in the group. For example, the network security monitor 120 (e.g., via the classifier 225) can determine the weighted geometric mean of each clustering technique's threat severity scores for each entity. A cluster's threat severity score can be calculated based on security related counters and assigned to each entity. Each clustering technique can produce a unique threat severity score for each cluster. The network security monitor 120 can produce a unique threat severity score for each cluster. The network security monitor 120 can determine the final threat severity score of the cluster as a weighted geometric average of the threat severity scores of each clustering technique. The network security monitor 120 can update the threat severity scores when clustering techniques are applied to the dataset. Threat severity scores can be calculated as the mean of the current instance and previous instance. Depending on the time context, the network security monitor 120 can save an appropriate list of threat severity scores. For example, if the time context is 1 hour, a list of last 24 hours threat severity scores are saved for each entity.

Thus, for each entity, the network security monitor 120 can determine the weighted geometric mean of threat severity scores based on each clustering technique. The network security monitor can determine a confidence score of the dataset. To determine the confidence, the network security monitor can apply one or more linear functions depending on the number of data points, where each entity and its features are considered one data point. Confidence is a function of data points scaled for 0 to 21 and can be identical for all data points during the same clustering technique. The network security monitor can use a first linear function for [0, 1000] data points and another linear function for [1,000, 5000] data points. For more than 5000 data points, the network security monitor can set the confidence to 1. The network security monitor can use other ranges or thresholds and vary the linear functions.

The network security monitor 120 can include a threat mitigator 230 designed and constructed to generate an alarm or control a device associated with a threatful entity or IP. The threat mitigator 120 can determine to generate an alert for an entity in a cluster of the plurality of clusters responsive to the threat severity score of the cluster being greater than a threshold. The network security monitor 120 (e.g., via threat mitigator 120) can generate an alert for each entity based on the confidence score and threat severity score. For example, the network security monitor 120 can generate an alert when:

An entity exceeds a threat severity score (e.g., 0.5)
An entity exceeds a threat severity score difference (e.g., 0.3)
An entity that used to belong to a specific cluster for consequent time frames, changes cluster.
An entity that used to belong to a cluster and now belongs to a group of outliers or vice versa.

The network security monitor 120 can transmit (e.g., via network 104 or 204) or otherwise convey the alert to an administrator of the entity, device or organization. The network security monitor can transmit instructions to remotely disable the device, reset the device, apply a software patch to the device, or otherwise control or manipulate the device to mitigate the threat.

The network security monitor 120 can determine to generate the alert for the entity absent an attack on the entity being detected during a time interval. For example, the entity many not have been attacked yet (or in the last hour, 24 hours, 48 hours, etc.) but the network security monitor 120 can determine to generate the alert based on the entity being assigned to a behavior cluster having a threat score greater than a threshold, which can be determined based on the threat scores of the other entities in the behavior cluster. The network security monitor 120 can transmit the alert for the entity. The alert can include an indication to disable the entity, reset the entity, or apply a software patch to the entity.

In an illustrative example, the network security monitor 120 (e.g., via cluster generator 220) applies behavior clustering and forms a group with IPs: [IP1, IO2, IP3, IP4, IP5]. The network security monitor 120 (e.g., via cluster generator 220) can determine that all 5 IPs have a similar behavior. The network security monitor 120 can identify that IP1, IP2, IP3, IP4, had at least one recorded threat event through their Intrusion Detection system ("IDS") during the last hour. The network security monitor 120 (e.g., via classifier 225) can determine that the threat severity of the group is 4 (the IPs with at least one recorded threat event) divided by 5 (all the IPs of the group).

While no threat event was recorded for IP5, the network security monitor 120 (e.g., via classifier 225) can also consider IP5 to be "threadfull" with a threat severity score of 4/5=0.8, which is equal to its corresponding group. Based on the threat severity score, the network security monitor 120 (e.g., via threat mitigator 230) can generate an alarm for IP5 to notify an administrator or disable or patch the device associated with IP5, because its threat severity score of 0.8 is above a threat threshold (e.g., 0.5). The network security monitor 120 (e.g., via threat mitigator 230) may not trigger an alarm for IP1, IP2, IP3 and IP4. Instead, the network security can store their threat severity scores in a database for future use.

In a second illustrative example, the network security monitor 120 (e.g., via the cluster generator 220) can apply behavior clustering to form an outlier group (e.g., IPs that do not belong to any groups) with IPs: [IP1. IP2, IP3]. The network security monitor 120 (e.g., via cluster generator 220) can determine that the 3 IPs in this outlier group do not have similar behaviors and do not form groups with other IPs. IP1 and IP3 may have had at least one recorded threat event trough their IDS during the last hour. The network security monitor 120 (e.g., via classifier 225) can determine that the threat severity of the outlier group is calculated as 2 (the IPs with at least one recorded threat event) divided by 3 (all the IPs of the outlier group).

While no threat event was recorded for IP2, the network security monitor 120 (e.g., via classifier 225) can consider IP2s "threatfull" with a threat severity score of 2/3=0.67, which is equal to its corresponding group. The network security monitor 120 (e.g., via threat mitigator 230) can generate or trigger an alarm for IP2 to notify the administrator, because its threat severity score 0.67 was above a threat threshold (e.g., 0.5). The network security monitor 120 (e.g., via the threat mitigator 230) may not trigger an alarm for IP1 and IP3, and my store their threat severity scores in a database for future use.

In a third illustrative example, the network security monitor 120 (e.g., via cluster generator 220) can apply behavior clustering to form a group with IPs: [IP1, IP2, IP3, IP4, IP5]. The network security monitor 120 (e.g. via the classifier 220) can determine that all 5 IPs have similar behaviors. The network security monitor 120 (e.g., via the classifier 225) can determine that IP1 and IP2 had at least one recorded threat event through their IDS during the last hour. The network security monitor 120 (e.g., via the classifier 225) can determine the threat severity of the group as 2 (the number of IPs with at least one recorded threat event) divided by 5 (all the IPs of the group) to result in a threat severity score of 0.4.

The network security monitor 120 may not have previously identified IP5 as "threatfull", which may have resulted in IP5 having a threat severity score equal to zero in the last 24 hours. For example, IP5 may have been a part of a different group or cluster. While the network security monitor 120 did not record any threat event for IP5, the network security monitor 120 (e.g., via classifier 225) can determine IP5 is "threatfull" because of the difference between its previous threat severity score and its current threat severity score, which is equal to the group's threat severity score of 0.4. Responsive to the difference being greater than or equal to a threat difference threshold (e.g., 0.3), the network security monitor 120 (e.g., via threat mitigator 230) can generate an alarm for IP5 to notify the administrator or otherwise control the device corresponding to IP5. The network security monitor 120 may not trigger an alarm for IP1, IP2, IP3 and IP4, and store their threat severity scores in a database.

In a fourth illustrative example, the network security monitor 120 (e.g., the cluster generator 220) can apply behavior clustering to form an outlier group (e.g., IPs that do not belong to any groups) with IPs: [IP1, IP2, IP3]. The network security monitor 120 (e.g., via cluster generator 220) can determine that all 3 IPS do not have similar behaviors and do not form groups with other IPs. The network security monitor 120 (e.g., via classifier 225 or data collector 210) can identify that IP1 had at least one recorded threat event through their IDS during the last hour. The network security monitor 120 (e.g., via classifier 225) can determine the threat severity of the outlier group as 1 (the IPs with at least one recorded threat event) divided by 3 (all the IPs of the outlier group) to equal 0.33.

The network security monitor 120 can determine (e.g., by retrieving historical records or cluster information from database 235) that IP2 used to form groups with other IPs in the last 24 hours. While no threat event was recorded about IP2, the network security monitor 120 (e.g., via classifier 225) can determine that IP2 is "threatfull" with a threat severity score of 1/3=0.33 equal to its corresponding group. The network security monitor 120 (e.g., via classifier component) can determine that IP2 is threatful because of the change in its behavior (e.g., IP2 used to belong to a different group, but is now considered as an outlier). The network security monitor 120 (e.g., via threat mitigation component) can generate an alarm for IP2 to notify the administrator or otherwise control the device corresponding to IP2, because IP2 had an unusual behavior. The network security monitor 120 may not generate an alarm for IP2 and IP3, and store their threat severity scores in the database for future use.

In a fifth illustrative example, the network security monitor 120 (e.g., via the cluster generator 220) can apply behavior clustering to form an outlier group with IPs: [IP1, IP2, IP3]. The network security monitor 120 (e.g., via cluster generator 220) can determine that all 3 IPS do not have similar behaviors and do not form groups with other IPs. The network security monitor 120 can determine that IP1 had at least one recorded threat event through their IDS during the last hour. The network security monitor 120 (e.g., via classifier 225) can determine the threat severity of the outlier group as 1 (the number of IPs with at least one recorded threat event) divided by 3 (the number of IPs of the outlier group).

The network security monitor 120 can determine that this is the first time logs are received about IP2. While no threat event was recorded about IP2, the networks security monitor 120 (e.g., via classifier 225) can determine IP2 is also "threatfull" with a threat severity score of 1/3=0.33, which is equal to its corresponding group. The network security monitor 120 (e.g., via classifier 225) can determine IP2 is threatful because it is considered as a "first seen" event that also had an "outlier" behavior. The network security monitor 120 (e.g., via threat mitigator 230) can generate an alarm for IP2 that notifies the administrator or otherwise controls the device associated with IP2, because IP2 is considered a "first seen" event. The network security monitor 120 may not generate an alarm for IP1 and IP3, and store their threat severity scores in the database.

Figure 3:
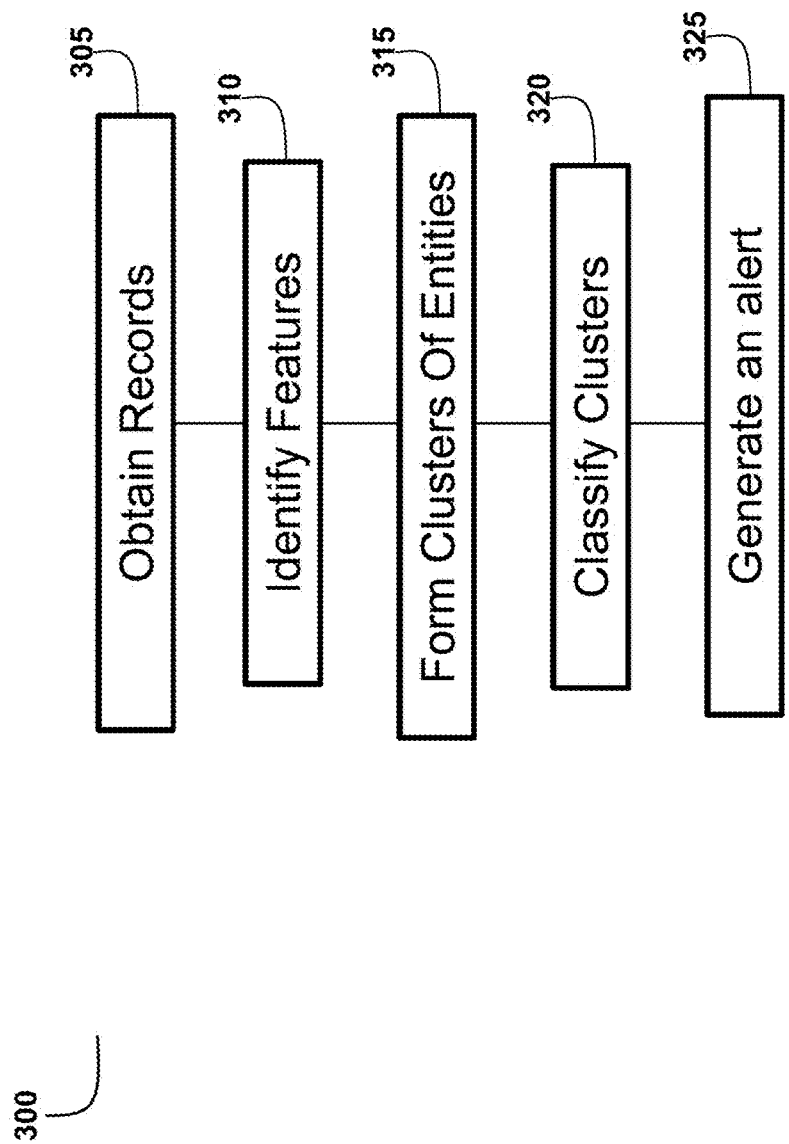
FIG. 3 is a flow diagram depicting a method for behavioral clustering, in accordance with an embodiment.

FIG. 3 is a flow diagram depicting a method for behavioral Clustering, in accordance with an embodiment. The method 300 can be performed by one or more component, module or system depicted in FIGS. 1A-2, including, for example, the network security monitor 120. In brief overview, method 300 can include a network security monitor obtaining records at step 305. At step 310, the network security monitor can identify features. At step 315, the network security monitor can form clusters of entities. At step 320, the network security monitor can classify the clusters. At step 325, the network security monitor can mitigate a threat posed by an entity of a cluster.

Still referring to FIG. 3, and in further detail, the network security monitor can obtain records or collect log data of entities at step 305. The network security monitor can obtain records for entities that access a network. The records can include attributes associated with the entities. The network security monitor can collect raw logs, network traffic information, network activity information, or other information associated with one or more networked, devices or entities. The network security monitor can collect the data in real-time, or based on a time interval. The network security monitor can send a query for the data. The network security monitor can store the data in a database for later processing. The network security monitor can encrypt the data and store the encrypted data in the database.

At step 310, the network security monitor can identify features. The network security monitor can parse the log data to extract features or attributes associated with the logs. The features or attributes can correspond to an entity (e.g., a device having an IP) on the network. The network security monitor can transform the features, scale the features, or standardize the features to facilitate further processing. The network security monitor can generate a feature set for each entity. The feature set for an entity can correspond to a data point or behavior.

In some cases, the network security monitor can apply weights to features to indicate that a feature is more significant than another feature such that the more significant feature plays a greater role with respect to forming a group. For example, if a First feature is highly significant, and second and third features are insignificant, then the network security monitor can form a group of entities that have the first feature in common, even if they do not have the second and third features in common.

At step 315, the network security monitor can form clusters of entities. The network security monitor can apply one or more clustering techniques to the feature dataset. The network security monitor can apply one or more clustering techniques (e.g., dynamic clustering, DBSCAN, and HDBSCAN). The network security monitor can apply a dimensionality reduction technique to facilitate visualizing the performance of each clustering technique and apply appropriate weights. The cluster can include entities having a similar behavior determined based on the feature set of the entity. A cluster with a number of entities greater than or equal to a threshold can be considered a valid cluster, whereas a cluster with less than the threshold number of entities can be considered an outlier cluster. The network security monitor can detect or identify changes in clusters, such as an entity moving front one cluster to another cluster.

At step 320, the network security monitor can classify the clusters. The network security monitor can determine a weighted geometric mean of the clustering technique threat severity score for each entity. For example, if a cluster includes IP1, IP2, IP3 and IP4, and IP1 and IP2 recorded a threat, but IP3 and IP4 did not record a threat in the last time interval, then the weighted geometric mean of the threat severity score of the group can be 2 divided by 4, or 0.5. The network security monitor can thus assign a threat severity score of 0.5 to the group as well as entities IP3 and IP4 that did not have a threat.

The network security monitor can determine a confidence for the group's threat severity score based on the number of data points in the group. The network security monitor can assign a threat score for an entity based on the entity moving from one cluster to another cluster. For example, if data collected during a first time interval resulted in a feature set for the entity placing the entity in a first cluster, and then data collected during a second time interval resulted in a second feature set placing the entity in a second cluster, the network security monitor can detect the cluster movement and determine the cluster movement indicates an increased threat score for the entity that moved clusters. In some cases, the network security monitor can determine the change is threatful even if the second cluster is associated with a threat score that is less than the first cluster. For example, the second cluster can have a lower threat score as compared to the previous, first cluster, but the network security monitor may increase the threat score for the entity moving from the first cluster to the second cluster responsive to the entity moving clusters. In some cases, the network security monitor can increase the threat score by an amount based on how long the entity was in the first cluster. In some cases, the network security monitor can increase the threat score by a greater amount if the entity transitions multiple times, such as from a first cluster to a second cluster and back to the first cluster, or to a third cluster. These cluster transitions can indicate threatful behavior.

At step 325, the network security monitor can generate an alert to mitigate a threat posed by an entity of a cluster. For example, the network security monitor can generate an alarm or an instruction to control a function or operation of the device associated with a threat severity score greater than a threat threshold. The network security monitor may generate alarms for entities that do nor have a recorded threat in the last time interval in order to prevent a threat fro in occurring or indicate that they may be compromised.

While the invention has been particularly shown and described with reference to specific embodiments, it should be understood by those skilled in the art that various changes in form and detail may be made therein without departing from the spirit and scope of the invention described in this disclosure.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the data collector 210, or the feature generator 215, can be a single component, app, or program, or a logic device having one or more processing circuits, or part of one or more servers of the network security monitor 120.

The phraseology and terminology used herein is for the purpose of description and should not be regarded as limiting. The use of "Including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural cost configurations. References to any act or element, being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A'" and can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods.

What is claimed is:

1. A method of detecting threats in a network, comprising:
   obtaining, by a network security monitor, a plurality of records for a plurality of entities that access the network, the plurality of records comprising attributes associated with the plurality of entities;
   identifying, by the network security monitor, a plurality of features for each of the plurality of entities based on the attributes of each of the plurality of entities;
   generating, by the network security monitor, a feature set for each of the plurality of entities, the feature set generated from the plurality of features identified based on the attributes of each of the plurality of entities;
   forming, by the network security monitor, a plurality of clusters of entities based on the feature set for each of the plurality of entities;
   classifying, by the network security monitor, each of the plurality of clusters with a threat severity score calculated based on scores associated with entities forming each of the plurality of clusters;
   generating, by the network security monitor, an alert for an entity in a cluster of the plurality of clusters responsive to the threat severity score of the cluster being greater than a threshold; and
   transforming the plurality of features for each of the plurality of entities using at least one of a logarithmic function, exponential function, or root function; and
   generating the feature set for each of the plurality of entities using the transformed plurality of features for each of the plurality of entities.

2. The method of claim 1, comprising:
   aggregating in a time context the attributes associated with the plurality of entities using at least one of an average, sum, count, unique count, minimum value or maximum value; and
   identifying the features based on the aggregated attributes.

3. The method of claim 1, comprising:
   determining that a number of features identified for an entity of the plurality of entities is greater than the threshold;
   responsive to the determination, applying a linear dimensionality reduction technique to reduce the number of features for the entity; and
   generating the feature set for the entity using the reduced number of features.

4. The method of claim 3, wherein the linear dimensionality reduction technique comprises at least one of a principal component analysis, kernel principal component analysis, or graph-based kernel principal analysis technique.

5. The method of claim 1, comprising:
   forming the plurality of clusters of entities using a density-based spatial clustering technique.

6. The method of claim 1, wherein:
   the plurality of entities include internal internet protocol addresses (IPs), external IPs, autonomous system numbers, domains, electronic mail, or devices; and the plurality of features correspond to at least one of traffic related counters, security related counters, policy violations, alerts-related counters, device identifiers, or organization identifiers.

7. A method of detecting threats in a network 1, comprising:
  obtaining, by a network security monitor, a plurality of records for a plurality of entities that access the network, the plurality of records comprising attributes associated with the plurality of entities;
  identifying, by the network security monitor, a plurality of features for each of the plurality of entities based on the attributes of each of the plurality of entities;
  generating, by the network security monitor, a feature set for each of the plurality of entities, the feature set generated from the plurality of features identified based on the attributes of each of the plurality of entities;
  forming, by the network security monitor, a plurality of clusters of entities based on the feature set for each of the plurality of entities;
  classifying, by the network security monitor, each of the plurality of clusters with a threat severity score calculated based on scores associated with entities forming each of the plurality of clusters;
  generating, by the network security monitor, an alert for an entity in a cluster of the plurality of clusters responsive to the threat severity score of the cluster being greater than a threshold;
  weighting the plurality of features for each of the plurality of entities; and
  generating the feature set for each of the plurality of entities using the weighted plurality of features, wherein the feature set corresponds to a data point in a multidimensional space.

8. A method of detecting threats in a network 1, comprising:
  obtaining, by a network security monitor, a plurality of records for a plurality of entities that access the network, the plurality of records comprising attributes associated with the plurality of entities;
  identifying, by the network security monitor, a plurality of features for each of the plurality of entities based on the attributes of each of the plurality of entities;
  generating, by the network security monitor, a feature set for each of the plurality of entities, the feature set generated from the plurality of features identified based on the attributes of each of the plurality of entities;
  forming, by the network security monitor, a plurality of clusters of entities based on the feature set for each of the plurality of entities;
  classifying, by the network security monitor, each of the plurality of clusters with a threat severity score calculated based on scores associated with entities forming each of the plurality of clusters;
  generating, by the network security monitor, an alert for an entity in a cluster of the plurality of clusters responsive to the threat severity score of the cluster being greater than a threshold; and
  forming the plurality of clusters of entities using a dynamic clustering technique and at least two density-based spatial clustering techniques.

9. A method of detecting threats in a network, comprising:
  obtaining, by a network security monitor, a plurality of records for a plurality of entities that access the network, the plurality of records comprising attributes associated with the plurality of entities;
  identifying, by the network security monitor, a plurality of features for each of the plurality of entities based on the attributes of each of the plurality of entities;
  generating, by the network security monitor, a feature set for each of the plurality of entities, the feature set generated from the plurality of features identified based on the attributes of each of the plurality of entities;
  forming, by the network security monitor, a plurality of clusters of entities based on the feature set for each of the plurality of entities;
  classifying, by the network security monitor, each of the plurality of clusters with a threat severity score calculated based on scores associated with entities forming each of the plurality of clusters;
  generating, by the network security monitor, an alert for an entity in a cluster of the plurality of clusters responsive to the threat severity score of the cluster being greater than a threshold;
  determining to generate the alert for the entity absent an attack on the entity being detected during a time interval; and
  transmitting the alert for the entity, the alert comprising an indication to disable the entity, reset the entity, or apply a software patch to the entity.

10. A system for threat detection in a network, comprising:
  a network security monitor comprising one or more hardware processors and memory;
  a data collector of the network security monitor configured to obtain a plurality of records for a plurality of entities that access a network, the plurality of records comprising attributes associated with the plurality of entities;
  a feature generator of the network security monitor configured to identify a plurality of features for each of the plurality of entities based on the attributes of each of the plurality of entities, and generate a feature set for each of the plurality of entities, the feature set generated from the plurality of features identified based on the attributes of each of the plurality of entities;
  a cluster generator of the network security monitor configured to form a plurality of clusters of entities based on the feature set for each of the plurality of entities;
  a classifier of the network security monitor configured to classify each of the plurality of clusters with a threat severity score calculated based on scores associated with entities forming each of the plurality of clusters; and
  a threat mitigator of the network security monitor configured to generate an alert for an entity in a cluster of the plurality of clusters responsive to the threat severity score of the cluster being greater than a threshold,
  wherein the network security monitor is further configured to:
    transform the plurality of features for each of the plurality of entities using at least one of a logarithmic function, exponential function, or root function; and
    generate the feature set for each of the plurality of entities using the transformed plurality of features for each of the plurality of entities.

11. The system of claim 10, wherein the network security monitor is further configured to:
  aggregate in a time context the attributes associated with the plurality of entities using at least one of an average, sum, count, unique count, minimum value or maximum value; and
  identify the features based on the aggregated attributes.

12. The system of claim 10, wherein the network security monitor is further configured to:
- determine that a number of features identified for an entity of the plurality of entities is greater than the threshold;
- responsive to the determination, apply a linear dimensionality reduction technique to reduce the number of features for the entity; and
- generate the feature set for the entity using the reduced number of features.

13. The system of claim 12, wherein the linear dimensionality reduction technique comprises at least one of a principal component analysis, kernel principal component analysis, or graph-based kernel principal analysis technique.

14. The system of claim 10, wherein the network security monitor is further configured to:
- form the plurality of clusters of entities using a density-based spatial clustering technique.

15. The system of claim 10, wherein:
- the plurality of entities include internal internet protocol addresses (IPs), external IPs, autonomous system numbers, domains, electronic mail, or devices; and
- the plurality of features correspond to at least one of traffic related counters, security related counters, policy violations, alerts-related counters, device identifiers, or organization identifiers.

16. A system threat detection in a network, comprising:
- a network security monitor comprising one or more hardware processors and memory;
- a data collector of the network security monitor configured to obtain a plurality of records for a plurality of entities that access a network, the plurality of records comprising attributes associated with the plurality of entities;
- a feature generator of the network security monitor configured to identify a plurality of features for each of the plurality of entities based on the attributes of each of the plurality of entities, and generate a feature set for each of the plurality of entities, the feature set generated from the plurality of features identified based on the attributes of each of the plurality of entities;
- a cluster generator of the network security monitor configured to form a plurality of clusters of entities based on the feature set for each of the plurality of entities;
- a classifier of the network security monitor configured to classify each of the plurality of clusters with a threat severity score calculated based on scores associated with entities forming each of the plurality of clusters; and
- a threat mitigator of the network security monitor configured to generate an alert for an entity in a cluster of the plurality of clusters responsive to the threat severity score of the cluster being greater than a threshold,
- wherein the network security monitor is further configured to:
    - weight the plurality of features for each of the plurality of entities; and
    - generate the feature set for each of the plurality of entities using the weighted plurality of features, wherein the feature set corresponds to a data point in a multidimensional space.

17. A system for threat detection in a network, comprising:
- a network security monitor comprising one or more hardware processors and memory;
- a data collector of the network security monitor configured to obtain a plurality of records for a plurality of entities that access a network, the plurality of records comprising attributes associated with the plurality of entities;
- a feature generator of the network security monitor configured to identify a plurality of features for each of the plurality of entities based on the attributes of each of the plurality of entities, and generate a feature set for each of the plurality of entities, the feature set generated from the plurality of features identified based on the attributes of each of the plurality of entities;
- a cluster generator of the network security monitor configured to form a plurality of clusters of entities based on the feature set for each of the plurality of entities;
- a classifier of the network security monitor configured to classify each of the plurality of clusters with a threat severity score calculated based on scores associated with entities forming each of the plurality of clusters; and
- a threat mitigator of the network security monitor configured to generate an alert for an entity in a cluster of the plurality of clusters responsive to the threat severity score of the cluster being greater than a threshold,
- wherein the network security monitor is further configured to:
    - form the plurality of clusters of entities using a dynamic clustering technique and at least two density-based spatial clustering techniques.

18. A system for threat detection in a network, comprising:
- a network security monitor comprising one or more hardware processors and memory;
- a data collector of the network security monitor configured to obtain a plurality of records for a plurality of entities that access a network, the plurality of records comprising attributes associated with the plurality of entities;
- a feature generator of the network security monitor configured to identify a plurality of features for each of the plurality of entities based on the attributes of each of the plurality of entities, and generate a feature set for each of the plurality of entities, the feature set generated from the plurality of features identified based on the attributes of each of the plurality of entities;
- a cluster generator of the network security monitor configured to form a plurality of clusters of entities based on the feature set for each of the plurality of entities;
- a classifier of the network security monitor configured to classify each of the plurality of clusters with a threat severity score calculated based on scores associated with entities forming each of the plurality of clusters; and
- a threat mitigator of the network security monitor configured to generate an alert for an entity in a cluster of the plurality of clusters responsive to the threat severity score of the cluster being greater than a threshold,
- wherein the network security monitor is further configured to:
    - determine to generate the alert for the entity absent an attack on the entity being detected during a time interval; and
    - transmit the alert for the entity, the alert comprising an indication to disable the entity, reset the entity, or apply a software patch to the entity.

* * * * *